United States Patent Office 2,740,200
Patented Apr. 3, 1956

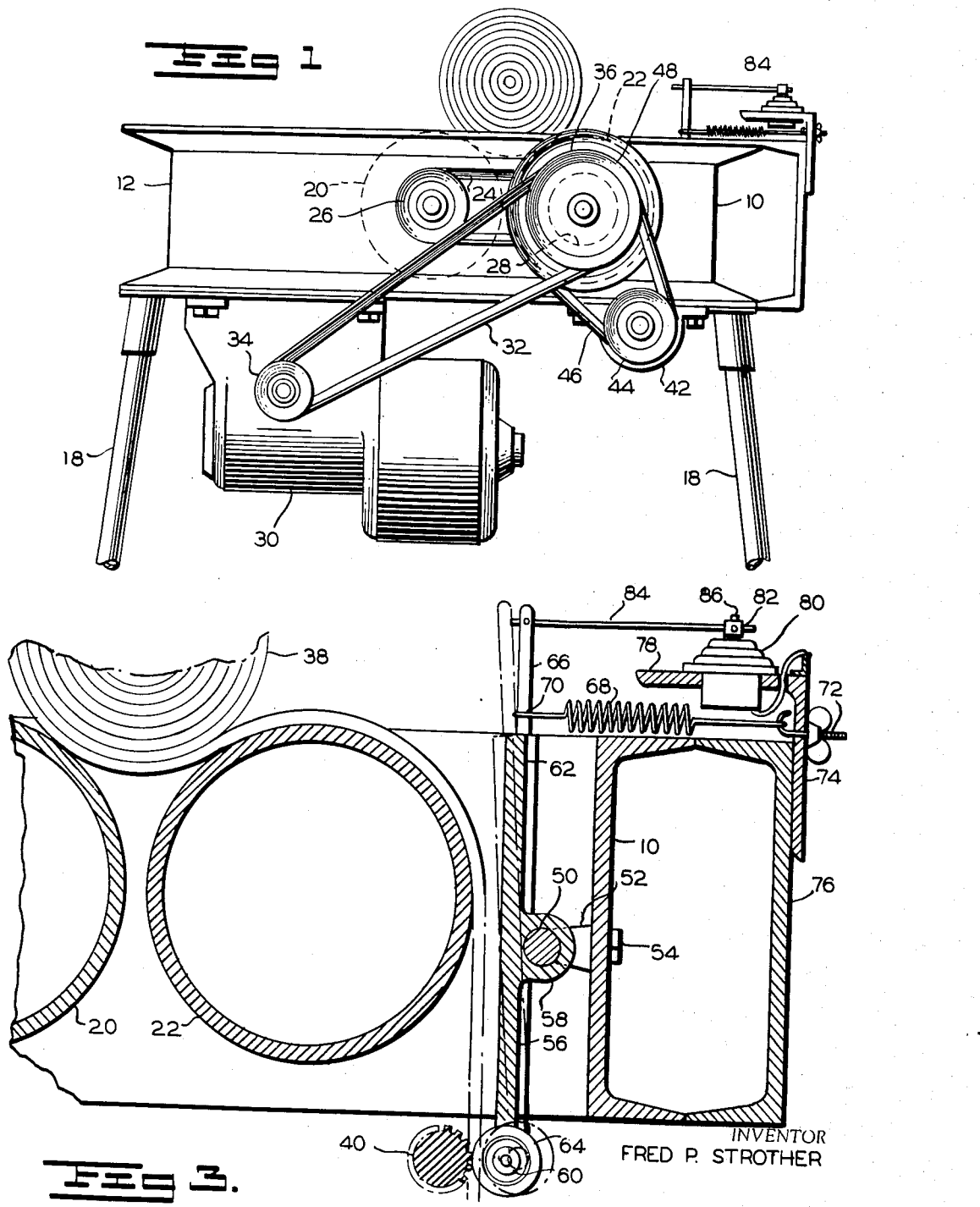

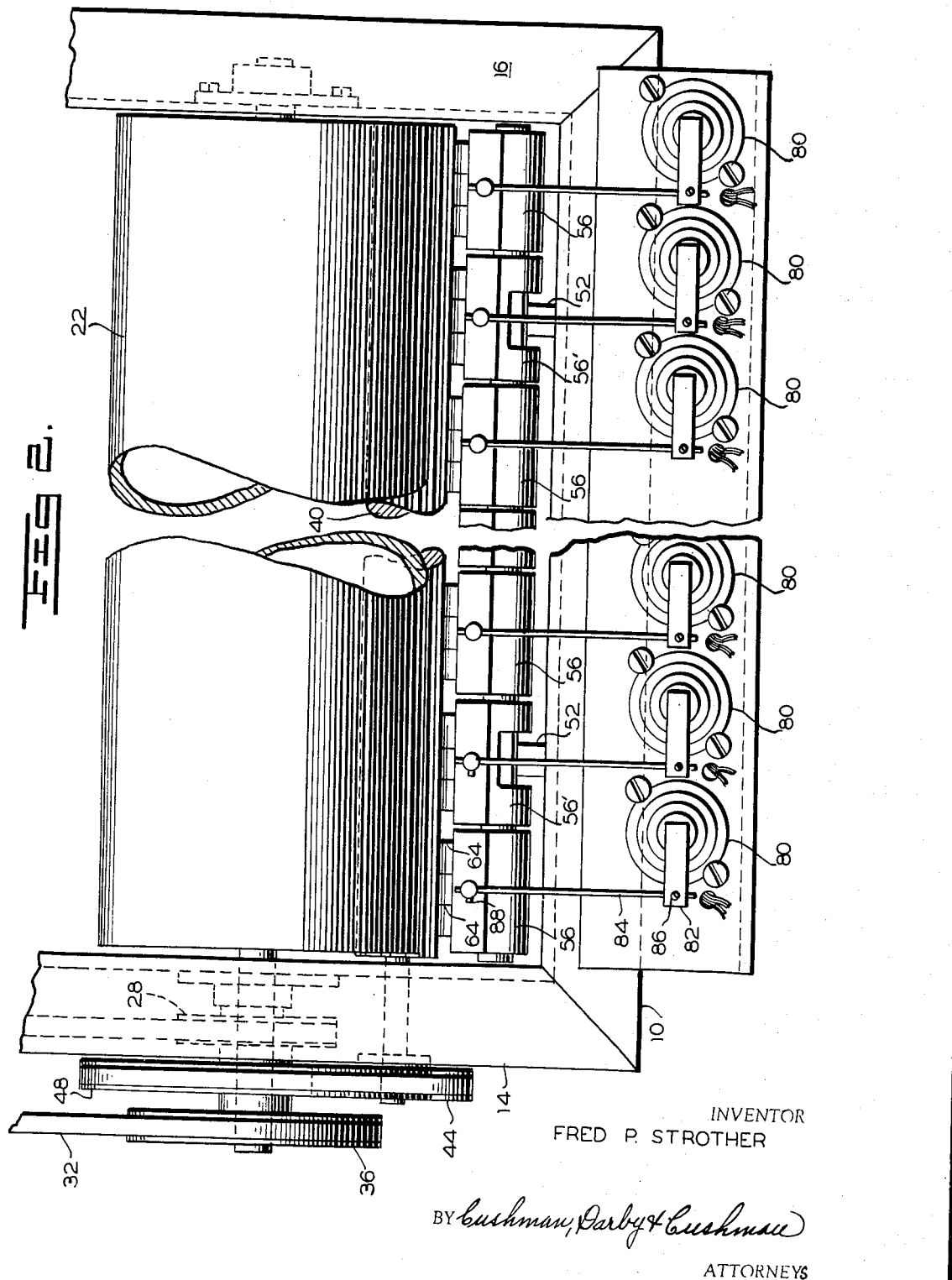

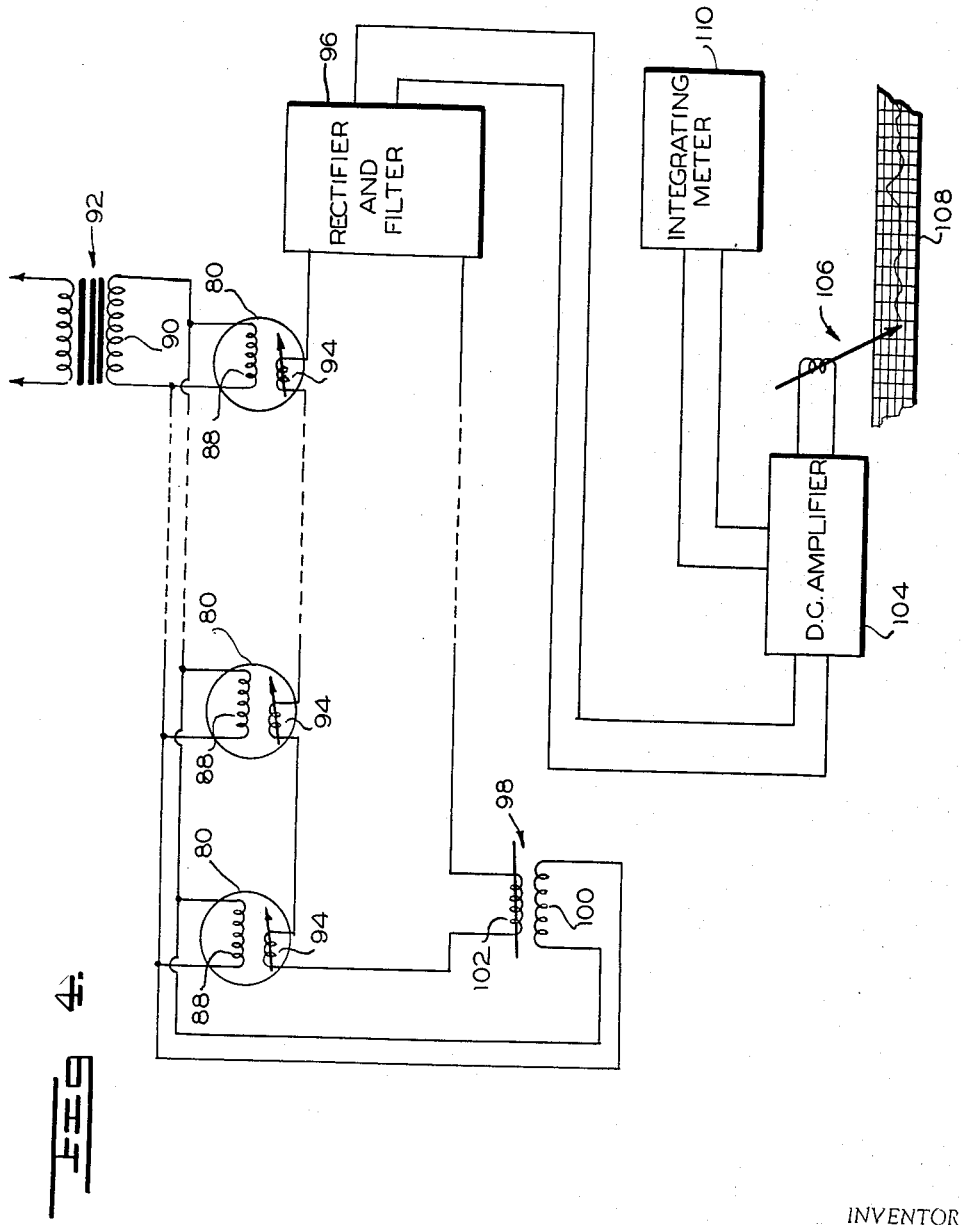

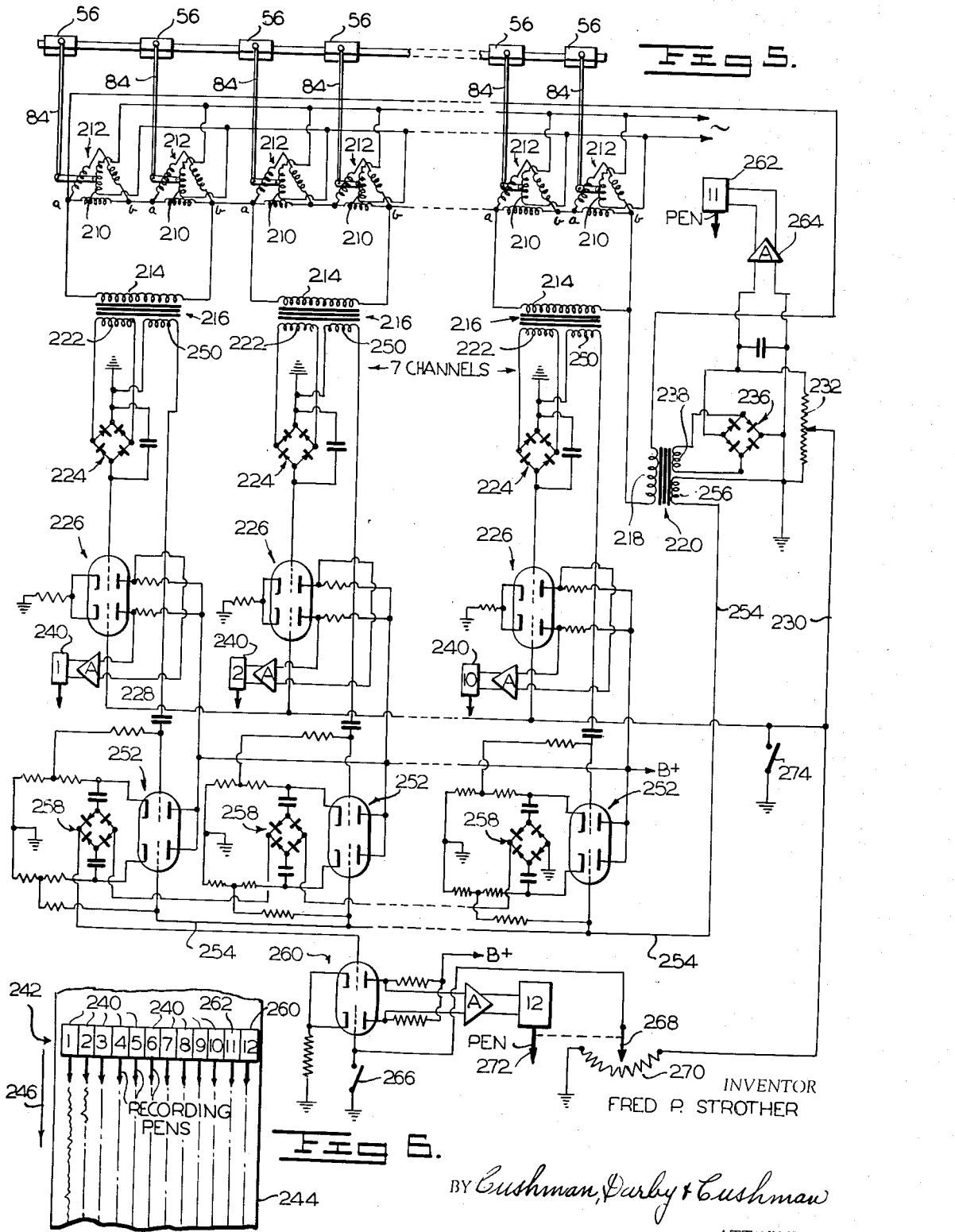

2,740,200

APPARATUS FOR TESTING THICKNESS OF MATERIAL

Fred P. Strother, Shawmut, Ala., assignor to West Point Manufacturing Company, West Point, Ga., a corporation of Alabama Application March 6, 1952, Serial No. 275,069

29 Claims. (Cl. 33—148)

This invention relates to measuring the thickness of textile lap and the like.

This application is a continuation-in-part of my copending application Serial No. 213,111, now Patent No. 2,680,299, filed February 28, 1951.

Briefly, this invention comprises electrical apparatus for providing an indication and record of the average thickness of successive widths of textile lap or the like. According to the invention, individual voltages indicating thicknesses of fractional parts of the width of a length of lap are electrically added to provide an indication of the average thickness of the lap.

A primary object of the invention, therefore, is to provide electric means for determining the average thickness of material such as textile lap.

A further object of the invention is to provide apparatus comprising an electric averaging system for determining and recording the average thickness of textile lap and the like.

It is a further object of this invention to provide a multi-channel recording arrangement for recording various expressions relating to lap being tested.

Further objects and the entire scope of the invention will become more fully apparent from the following detailed description and from the appended claims.

Further understanding of the invention may be had with reference to the accompanying drawings in which:

Figure 1 shows an end view of apparatus embodying the invention.

Figure 2 shows a reduced plan view of the apparatus in Figure 1.

Figure 3 shows a cross-sectional view of the apparatus of Figures 1 and 2.

Figure 4 shows a schematic electric diagram of circuits embodying the invention.

Figure 5 shows a schematic circuit diagram for a multi-channel recorder system forming a part of the invention, and Figure 6 shows a diagrammatic view of a multi-channel recorder used in connection with the circuit of Figure 5.

Referring now primarily to Figures 1–3, a channel member 10 provides a front frame member and channel member 12 provides a rear frame member. Joining channel members 10 and 12 are channel members 14 and 16 which form end members for the frame. The frame constituted by channel members 10, 12, 14 and 16 is supported by suitable legs 18.

Rotatable drums 20 and 22 are journalled in suitable bearings located in end channel members 14 and 16. These drums are adapted for rotary motion in unison by means of belt 24 operating on pulleys 26 and 28, respectively. A suitable speed reduction motor 30 is employed to drive the drums 20 and 22 in a clockwise direction as viewed in Figures 1 and 3, the motor 30 driving the drums by means of a belt 32 operating from pulley 34 at motor 30 and driving the shaft of drum 22 by means of pulley 36. Pulleys 26 and 28 are of equal diameter and, therefore, drums 20 and 22 will be driven at the same peripheral speed.

Drums 20 and 22 are so positioned that a roll 38 of lap or other material to be measured may be supported above and between the drums 20 and 22 and therefore if the drums are rotated the roll 38 will tend to unwind with the free end of the material trained downwardly over the side of drum 22.

Also suitably journalled for rotation on the end channel members 14 and 16 is a fluted roller 40. Roller 40 may be journalled in bearing blocks 42 attached to the lower flange of the end channel members. The shaft of roller 40 is extended beyond the channel members 14 and has keyed thereon a pulley 44 which is driven by belt 46 from a pulley 48 keyed to the shaft of drum 22. The relative dimensions of pulleys 44 and 48 are such that the peripheral speed of roller 40 is substantially equal to the peripheral speed of drums 20 and 22.

A shaft 50 with its ends terminating adjacent the inner surfaces of channel members 14 and 16 is supported from the inner surface of front channel member 10 by means of supporting posts 52. These posts may be maintained on the channel member 10 by means of bolts 54. Pivotally mounted on shaft 50 are a plurality of thickness sensing feeler members 56, these members being placed continuously along the length of shaft in side-by-side relation. At such points where a feeler member will interfere with a supporting post 52 the feeler member may be suitably bifurcated in its central position to accommodate the post 52. Such feeler members are designated 56'. Each feeler member 56 comprises a hub 58 receiving the shaft 50 and also comprises a lower end 60 and an upper end 62. At the lower end 60 are mounted two ball bearings 64 serving as rollers which may engage the material from roll 38 which is trained over the fluted roller 40. The upper end 62 of each feeler member 56 is provided with an upstanding post 66. A tension spring 68 extends from a point 70 of post 66 to an adjustable hook screw 72 mounted for longitudinal movement in a plate 74. The plate 74 is in turn suitably fastened as by welding to a channel member 76 suitably supported on previously mentioned channel member 10.

From the apparatus as thus far described it will be apparent that tension introduced by spring 68 will cause each of the feeler means 56 to tend to rotate clockwise about shaft 50 as viewed in Figure 3, to exert a predetermined pressure between the bearings 64 and the material overlying the fluted roller 40. Accordingly, when roller 40 is driven from motor 30 the material from roll 38 will be advanced between the roller 40 and the bearings 64. As the material thus advances, the post 66 will move toward and away from the supporting plate 74 according to the thickness of the material beneath the bearings 64 of a given feeler member 56.

As previously stated the primary object of the invention is to determine the average thickness of the width of material which at any given moment of time overlies the roller 40. This average thickness is determined by use of the following apparatus: The supporting plate 74 is provided with a rearwardly extending or horizontal shelf member 78 extending substantially the length of channel member 10. At spaced intervals corresponding to the spacing of feeler shoes 56 there are mounted in shelf 78 electric motor devices commonly referred to as selsyn motors. These motors are of a type which produce an electric signal indicating the rotational position of the shaft of the motor and will be well understood by those skilled in the art. Each of the selsyn motors is designated by reference character 80 and is provided with an arm 82 extending horizontally from the central shaft of the motor. Adjacent the outer end of each of the arms 82 there is provided an aperture through which a length of relatively stiff yet flexible wire 84, such as piano wire, may be passed. Wire 84 may be clamped in arm 82 by means of set screw 86. The end of the wires 84 opposite the arms 82 are similarly clamped in apertures in the upper ends of posts 66 by means of set screws 88.

From the apparatus as thus far described it will be apparent that as the feeler members 56 pivot about shaft 50 because of changing thickness of the material under rollers 40, the armatures of selsyn motors 80 will be rotated correspondingly through the push-pull action of wires 84 on motor arms 82.

Referring now to Figure 4, the stationary windings 88 of selsyn motors 80 are connected in parallel with the secondary winding 90 of a suitable transformer 92. The movable windings 94 are then connected in series in a circuit loop feeding a rectifier and filter circuit 96. In addition to the selsyn motors 80 there is also provided an auxiliary selsyn motor or other suitable magnetic pick-up 98 which may be preset to represent the average thickness of the material being run. The stationary winding 100 of motor 98 may be connected in parallel with stationary windings 88 and the movable winding 102 is connected in series with the movable windings 94 in the series loop feeding circuit 96. From the circuit as thus described it will be clear that the selsyn motors 80 provide a voltage which is proportional to the algebraic sum of the positions of all of the feeler members 56. The voltage in winding 102 also adds algebraically to the sum of voltages at the coils 94. The voltage available at the output of circuit 96 may be then amplified at circuit 104 and applied to any conventional automatic recording device 106 to produce a continuous record 108 of the thickness of the material as the latter is advanced over the roller 40. The amplified signal of circuit 104 may also be applied to an integrating meter 110 if desired.

From the foregoing it will be apparent that by the present invention there is provided an average thickness measuring apparatus which is substantially free of frictional losses and in which the indication derived from any given feeler member is free from any error caused by its relationship to the other feeler members.

Referring now to Figures 5 and 6, the additional features of my invention introduced by this application will be described. This phase of my invention relates to arrangements for picking up voltage indications from each of a multiplicity of feeler shoes so that a multiple pen recorder may be employed to make several different types of traces on the moving record member. By way of example, but without limitation, a "12 channel" recorder will be described in connection with Figures 5 and 6. However, it will become apparent as the description proceeds how any other number of channels may be involved.

Referring to Figure 5, there is shown at the top of the figure a plurality of the feeler shoes 56 described in connection with the above embodiment of the invention. Each of the feeler shoes 56 is connected by its operating shaft 84 to operate the movable coil 210 of pick-up units designated generally as 212, each unit having three stationary windings. This form of unit is of a conventional variety and will be well known to those skilled in the art to which this invention pertains. The arrangement of the pick-up units 212 is such that a voltage will be established between terminals *a* and *b* of each unit representative of the degree of rotation of the movable winding 210.

The terminals *a* and *b* of each pair of adjacent pick-up units, associated with adjacent ones of feeler shoes 56, are connected in series across the primaries 214 of isolating transformers 216. In addition, all of the units 212 are connected in series between their terminals *a* and *b* and these combined units are further connected in series across the primary 218 of transformer 220. It is also within the scope of the invention that the primaries 214 of transformer 216 could be across but a single one of the units 212, or, on the other hand, more than two of the units can be ganged together.

Each of the transformers 214 is provided with a first secondary winding 222 which feeds a rectifier circuit 224. The D. C. output of rectifiers 224 is applied between ground and one input grid of a difference amplifier 226. Difference amplifiers are well known in the electronic art and will be well understood by those skilled in such art. Several types of difference amplifiers are known and basis of operation of such circuits may be well understood by reference, for example, to page 52 of "Electronics: Experimental Techniques," Elmore and Sands, McGraw Hill 1949. Basically, the difference amplifier is a circuit element which is capable of combining two independent input voltage signals to give an output signal that is linearly related to the difference of the two input signals.

With reference to difference amplifiers 226, one input will be the D. C. potential from rectifiers 224 and the other will be an input over line 228 connected through a line 230 to a potentiometer 232. This potentiometer is connected across the D. C. terminals of a rectifier circuit 236 which is fed with an alternating current from a first secondary winding 238 of previously mentioned transformer 220.

The output of each of the difference amplifiers 226 is connected to operate one pen unit 240 of a multi-pen recorder designated generally as 242 in Figure 6. In Figure 6, there is shown in addition to the multi-pen recorder 242, a strip of record paper 244 which may be moved relative to the pen unit in the direction of arrow 246.

It will be noted on Figures 5 and 6 that each of the recording pen units 240 connected with the difference amplifiers 226 is designated by a numeral, beginning with 1 and ending with 10 (numbers 3–9 not shown in Figure 5). It will be understood that in Figure 6 the correspondingly numbered segments of multi-pen recorder unit 242 relate to the designated individual units 240 in Figure 5.

From the invention as thus far described, it will be apparent that the voltage in each of the transformer secondaries 222 will cause one input to the difference amplifiers to represent the average value of lap thickness tested by the associated pair of feeler shoes 56. The secondary 238 of transformer 220 will produce a voltage representative of the algebraic sum of the voltages of each of the pick-up units 212. Accordingly, the potential average over lines 230 and 228, which provides the second inputs to the difference amplifiers 226, will represent the overall average of the algebraic sum. Accordingly, the output of the difference amplifiers 226 as recorded by pens 1–10 will represent a comparison of the output of each pair of pick-ups with the average value of the feeler shoe positions.

The transformers 216 are provided with additional secondaries 250 which apply a first input to A. C. driven difference amplifiers 252. The second input to each of these difference amplifiers is established over line 254 connected with a second secondary 256 of transformer 220. The side of secondary 256 opposite line 254 is connected to a ground. Accordingly, it will be clear that the first input to difference amplifiers 252 again represents the average of each pair of pick-up units, while the second inputs represent the overall average of the pick-up units. Each of the difference amplifiers 252 is provided with a rectification circuit 258 and the D. C. terminals of these rectifiers are connected in series adding between ground (at stage 10) and the first input to a difference amplifier 260 associated with recorder channel 12. Accordingly, the potential between the first input of difference amplifier 260 and ground represents the arithmetic sum of the differences of the pairs of pick-up units.

The recorder unit for channel 11 is designated 262 in

Figure 5 and receives its input from an amplifier 265 connected across the D. C. terminals of previously mentioned rectifier 236. Accordingly, it will be clear that the pen in channel 11 records the overall average of the positions of all of the feeler shoes 56.

The second input of difference amplifier 260 by means of switch 266 may be selectively grounded or permitted to be attached solely to the arm 268 of a rheostat 270 operated by the pen 272 in channel 12 of the recorder 242. The resistance coil of potentiometer 270 is connected at one side to ground and at the other side to the previously mentioned line 230 extending from a point of the voltage divider comprising resistors 232 and 234. It is, therefore, apparent that with switch 266 closed, the second input to difference amplifier 260 will be maintained at ground and the channel 12 pen will record the arithmetic sum of the differences of the positions of the pairs of feeler shoes 56. On the other hand, if switch 266 is permitted to remain open, then the pen in channel 12 will read in terms of the percentage deviation of the sum of the settings from the average setting of the feeler shoes 56 (arithmetic sum of differences divided by average value).

It is a further aspect of this invention that the voltage across the D. C. terminals of rectifier 236, representing the average thickness of the lap across the entire width thereof may be fed into a suitable amplifier and integrating network so that a trace proportional to the average thickness of the lap integrated over whatever lengthwise distance is desirable may be available. Such integration may be performed by a suitable resistance-capacitance network, as will be familiar to those skilled in the art. The value of an integrated trace is that long term variations in the thickness of the lap are more easily read from such a trace.

It will also be clear that by grounding line 228 as by switch 274 channels 1 to 10 will read the actual thicknesses of the material under the associated feeler shoes 56.

It may now be appreciated that in accordance with the present invention it is possible to develop a record including the several traces as described above from which may be determined the variations in thickness across the width of the lap, as well as along the length thereof. As mentioned above, the groups of feeler members may be made to consist of one shoe or a number greater than two, depending upon what detail thickness variations across the width of the lap is desirable. The significant usefulness of charts developed according to any of the embodiments of the present invention is that a great deal of information may be gleaned which permits the redesign and adjustment of the mechanisms which are employed to actually form the lap which is later tested in the present machines.

The foregoing detailed description has been given only for purposes of illustration and is not intended to limit the scope of the invention. The true scope of the invention is to be determined from the appended claims.

I claim:

1. In thickness testing apparatus comprising a plurality of thickness measuring shoes each connected to suitable pick-up means, means for averaging the outputs of all of the pick-ups for obtaining an overall average value and comparing the output of a predetermined number less than all of the pick-up means with said overall average value, means for recording the difference in said values for each said predetermined number of pick-ups, means for recording said overall average value, and means for determining the arithemetic sum of the differences of position of each of said predetermined numbers of pick-up means.

2. Apparatus as in claim 1 and further including means for recording the last mentioned sum.

3. Apparatus as in claim 1 and further including means for determining and recording the percentage deviation of the last mentioned sum from said average of the outputs of all of the pick-ups.

4. In thickness testing apparatus comprising a plurality of thickness measuring members each connected to an electrical position responsive means, means for connecting the position responsive means in series to obtain an overall output representing the average position of the members, means for obtaining an output representing the average position of sub-groups of the members, and means responsive to the just mentioned means for producing an output for each sub-group reresenting the deviation of each sub-group output from said overall output.

5. In thickness testing apparatus comprising a plurality of thickness measuring members each connected to an electrical position responsive means, means for connecting the position responsive means in series to obtain an overall output representing the average position of the members, means for recording said average output as one trace on a moving record member, means for obtaining an output representing the average position of sub-groups of the members, means responsive to the just mentioned means for producing an output for each sub-group representing the deviation of each sub-group output from said overall output, and means for recording the just mentioned outputs as discrete traces on said moving record member.

6. In thickness testing apparatus comprising a plurality of thickness measuring members each connected to an electrical position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said sub-group average position output for providing an output representing the sum of the average positions of the sub-groups.

7. In thickness testing apparatus comprising a plurality of thickness measuring members each connected to an electrical position responsive means, means for connecting the position responsive means in series to obtain an overall output representing the average position of the members, means for recording said average output as one trace on a moving record member, means for obtaining an output representing the average position of sub-groups of the members, means responsive to the just mentioned means for producing an output for each sub-group representing the deviation of each sub-group output from said overall output, means for recording the just mentioned outputs as discrete traces on said moving record member, means responsive to said sub-group average position output for providing an output representing the sum of the average positions of the sub-groups, and means for recording the just mentioned output as a discrete trace on said record member.

8. In thickness testing apparatus comprising a plurality of thickness measuring members each connected to an electrical position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said sub-group average position output including A. C. driven difference amplifiers having rectification circuits for providing an output representing the sum of the average positions of the sub-groups.

9. In thickness testing apparatus comprising a plurality of thickness measuring members each connected to an electrical position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said sub-group average position output for providing an output representing percentage deviation of the sum of the deviations from said overall average.

10. In thickness testing apparatus comprising a plurality of thickness measuring members each connected to an electrical position responsive means, means for connecting the position responsive means in series to obtain an overall output representing the average position of the members, means for recording said average output as one trace on a moving record member, means for obtaining an output representing the average position of sub-groups of the members, means responsive to the just mentioned means for producing an output for each sub-group representing the deviation of each sub-group output from said overall output, means for recording the just mentioned outputs as discrete traces on said moving record member, means responsive to said sub-group average position output for providing an output representing percentage deviation of the sum of the deviations from said overall average, and means for recording the just mentioned output as a discrete trace on said record member.

11. In thickness testing apparatus comprising a plurality of thickness measuring members each connected to an electrical position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said sub-group average position output including A. C. driven difference amplifiers having rectification circuits for providing an output representing percentage deviation of the sum of the deviations from said overall average.

12. Apparatus as in claim 6 in which the means for producing the sub-group deviation from the overall output comprises difference amplifier means.

13. Apparatus as in claim 12 in which said sub-groups each consist of a single member.

14. Apparatus as in claim 8 in which the means for producing the sub-group deviation from the overall output comprises difference amplifier means.

15. Apparatus as in claim 11 in which the means for producing the sub-group deviation from the overall output comprises difference amplifier means.

16. Apparatus as in claim 5 in which said sub-groups each consist of a single member.

17. Apparatus as in claim 6 in which said sub-groups each consist of a single member.

18. Apparatus as in claim 7 in which said sub-groups each consist of a single member.

19. Apparatus as in claim 9 in which said sub-groups each consist of a single member.

20. Apparatus as in claim 10 in which said sub-groups each consist of a single member.

21. In thickness testing apparatus comprising a plurality of thickness measuring members each connected to a position responsive means, means for connecting the position responsive means in series to obtain an overall output representing the average position of the members, means for obtaining an output representing the average position of sub-groups of the members, and means responsive to the just mentioned means for producing an output for each sub-group representing the deviation of each sub-group output from said overall output.

22. In thickness testing apparatus comprising a plurality of thickness measuring members each connected to a position responsive means, means for connecting the position responsive means in series to obtain an overall output representing the average position of the members, means for recording said average output as one trace on a moving record member, means for obtaining an output representing the average position of sub-groups of the members, means responsive to the just mentioned means for producing an output for each sub-group representing the deviation of each sub-group output from said overall output, and means for recording the just mentioned output as discrete traces on said moving record member.

23. In thickness testing apparatus comprising a plurality of thickness measuring members each connected to a position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said sub-group average position output for providing an output representing percentage deviation of the sum of the deviations from said overall average.

24. In thickness testing apparatus comprising a plurality of thickness measuring members each connected to a position responsive means, means for connecting the position responsive means in series to obtain an overall output representing the average position of the members, means for recording said average output as one trace on a moving record member, means for obtaining an output representing the average position of sub-groups of the members, means responsive to the just mentioned means for producing an output for each sub-group representing the deviation of each sub-group output from said overall output, means for recording the just mentioned outputs as discrete traces on said moving record member, means responsive to said sub-group average position output for providing an output representing percentage deviation of the sum of the deviations from said overall average, and means for recording the just mentioned output as a discrete trace on said record member.

25. In thickness testing apparatus comprising a plurality of thickness measuring members each connected to a position responsive means, means for connecting the position responsive means in series to obtain an overall output representing the average position of the members, means for obtaining an output representing the average position of sub-groups of the members, means responsive to the just mentioned means for producing an output for each sub-group representing the deviation of each sub-group output from said overall output, and means responsive to said overall output and including integration means for integrating the overall output over a predetermined period of time.

26. In computing apparatus responsive to a plurality of varying output values, means for averaging all of the output values to obtain an overall average value and comparing a predetermined number less than all of the output values with said overall average value, means for recording the difference in said values for each of said predetermined number of values, means for recording said overall average value, and means for determining the arithmetic sum of the differences of value of each of said predetermined numbers of values.

27. In computing apparatus responsive to a plurality of varying output values, means for connecting the output values in series to obtain an overall output representing the average of the output values, means for obtaining an output representing the average output value of sub-groups of the outputs, means responsive to the just mentioned means for producing an output for each sub-group representing the deviation thereof from said overall output, and means responsive to said sub-group average output value for providing an output representing the sum of the average outputs of the sub-groups.

28. Apparatus as in claim 27, wherein the means responsive to the sub-group average output values includes A. C. driven difference amplifiers having rectification circuits.

29. In computing apparatus responsive to a plurality of varying output values, means for connecting the output values in series to obtain an overall output representing the average of the output values, means for recording said average output value as one trace on a moving record member, means for obtaining an output representing the average output values of sub-groups of the output values, means responsive to the just mentioned means for producing an output for each sub-group representing the deviation of each sub-group output value from said overall output value, means for recording the just mentioned output values as discrete traces on said moving record member, means responsive to said sub-group average output values for providing an output representing percentage deviation of the sum of the deviations from said overall average output values, and means for recording the just mentioned output as a discrete trace on said record member.

References Cited in the file of this patent

UNITED STATES PATENTS

| | | |
|---|---|---|
| 1,704,386 | Harding | Mar. 5, 1929 |
| 2,360,507 | Minton | Oct. 17, 1944 |
| 2,503,387 | Hartwig | Apr. 11, 1950 |
| 2,592,342 | Ryckman | Apr. 8, 1952 |
| 2,602,586 | Davidson | July 8, 1952 |